G. LIGOWSKY,

Assignor, by mesne assignments, to LIGOWSKY & Co., said LIGOWSKY & Co. assignors to THE LIGOWSKY CLAY PIGEON COMPANY.

FLYING TARGET.

No. 10,122. Reissued May 23, 1882.

Attest.
John W. Layman
Wm. Hallman

Inventor.
George Ligowsky
by James H. Layman
Attorney.

N. PETERS, Photo-Lithographer, Washington, D. C.

UNITED STATES PATENT OFFICE.

GEORGE LIGOWSKY, OF CINCINNATI, OHIO, ASSIGNOR, BY MESNE ASSIGNMENTS, TO LIGOWSKY & CO., OF SAME PLACE; SAID LIGOWSKY & CO. ASSIGNORS TO THE LIGOWSKY CLAY PIGEON COMPANY, OF SAME PLACE.

FLYING TARGET.

SPECIFICATION forming part of Reissued Letters Patent No. 10,122, dated May 23, 1882.

Original No. 231,919, dated September 7, 1880. Application for reissue filed August 16, 1881.

*To all whom it may concern:*

Be it known that I, GEORGE LIGOWSKY, of Cincinnati, Hamilton county, Ohio, have invented certain new and useful Improvements in Flying Targets, of which the following is a specification.

My improvement consists in constructing flying targets in such a manner as to cause them to imitate more closely the flight of a bird as soon as the device is projected from a suitable trap or "sender." This result is accomplished by giving to such targets a concave or dished or saucer shape, whose rim is slotted to receive a tongue of thin sheet metal or other light material, which tongue is to be inserted between the jaws of any trap capable of projecting the target in the manner desired. The target, being thrown by a force thus applied near its periphery, has an axial rotation imparted to it that insures the utmost accuracy of flight, while the concavity of the device serves to partially imprison the air as soon as the momentum of the target is spent. Consequently the target descends gradually, and is not broken in case it falls on hard ground.

Figure 1:
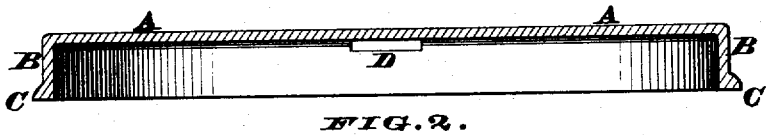
Figure 2:
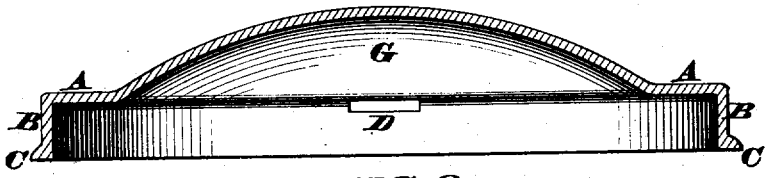
Figure 3:
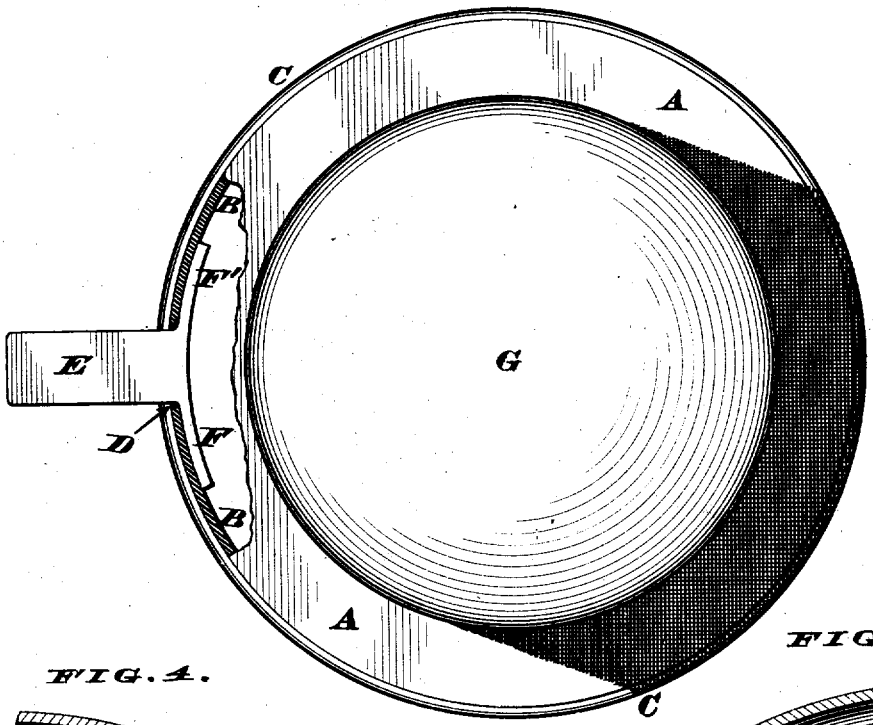
Figure 4:
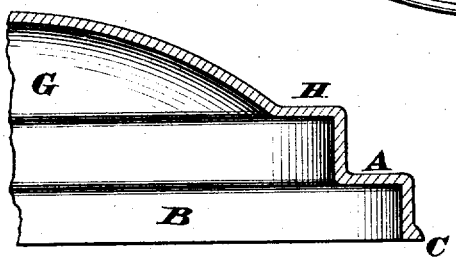
Figure 5:
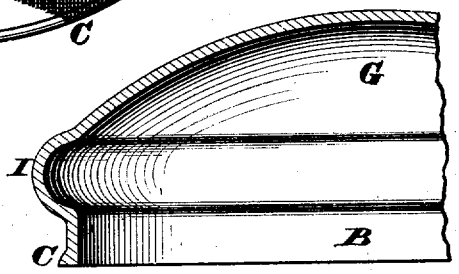

In the annexed drawings, Figure 1 is a vertical section of a simple form of my flying target. Figs. 2 and 3 are respectively a vertical section and plan of a modified form of the device, and Figs. 4 and 5 represent more complex forms of the target.

Referring to Fig. 1, A represents a flat plate, that is preferably circular, and has an annular flange or ring, B, whose lower edge is protected or strengthened by a rim or molding, C. Furthermore, this flange is slotted at D to admit a detachable tongue, E, composed of tin or any other light and cheap material, said tongue being provided with two lateral branches, F F′, bent so as to bear snugly against the inner surface of flange B, as seen in Fig. 3; but this plate B, instead of being perfectly flat, may be furnished with a pit or concavity, G, as seen in Fig. 2; or one or more steps or corrugations, H, may be interposed between said plate A and the concavity G, as represented in Fig. 4. The shape of the target may be further changed by joining the pit and flange with a molding or bead, I; but in either event it is preferred to make use of the rim C at the margin of flange B. Other modifications of the shape of the target will readily suggest themselves to any person familiar with such devices.

To use my target the tongue E is passed through slot D until the branches F F′ bear against the interior of flange B, after which act the projecting end of said tongue is grasped by a jaw or clamp of any suitable form of trap, the concavity of said target being turned toward the ground. The arm or spring of the trap carrying the aforesaid clamp is then allowed to swing around very quickly in a horizontal or inclined plane and to be suddenly arrested, thereby releasing the target from the clamp. Evidently the target will now be projected into the air with a velocity proportioned to the strength of the actuating-spring, and, being thrown by a force applied to its periphery, said target has imparted to it a very rapid axial rotation that insures the utmost accuracy of flight, and it is while the target is thus flying through the air that the marksman shoots at it in the usual manner; but if the target should not be destroyed by a shot the device will gradually alight on the ground, which gradual descent is occasioned by the air being imprisoned or cushioned in the concavity G. Consequently the target will not be broken in case it should fall on very hard ground, which security against accidental fracture is still further guarded against by the increased thickness of rim C.

The target may be composed of clay or earthenware, or any fragile material that will be readily shattered as soon as a shot comes in contact with the same; or, if preferred, the target may be coated externally with any fulminate capable of emitting more or less smoke as soon as the device is struck with a shot.

The tongue E, instead of being applied to the target, may constitute part of the trap or sender, being in this case so arranged as to readily slip out of the slot D when said trap is sprung; or said tongue may be twisted so as to have somewhat of a spiral shape for the purpose of imparting a wabbling motion to the target. It is preferred, however, to make use of the flat tongue herein described, because this device enables the target to be instantly applied to the trap jaw or clamp in such a manner as to insure the proper flight of said target. Furthermore, as the edge of the flat tongue is necessarily presented in the direction of progress, it affords the least possible opposition to the air, and consequently the flight of the target is not impeded to any material extent.

Finally, I do not propose to limit myself to the exact shape or proportions herein described and illustrated, as it is evident the leading feature of my invention will be attained by any construction that will permit a dished or concave target having an axial rotation imparted to it by the trap or sender that projects the device through the air.

I claim as my invention—

1. A flying target concave in general form, and provided with a flat peripheral tongue, wherewith the device is applied to the jaw or clamp of a trap, substantially as herein described, said flat tongue being separate and distinct from the target proper, for the purpose set forth.

2. A fragile flying target concave in general form, and provided with a flat peripheral tongue, wherewith the device is applied to the jaw or clamp of a trap, substantially as herein described, said flat tongue being separate and distinct from the target proper, for the purpose set forth.

3. The combination of the slotted concave flying target A B D and flat detachable tongue E F F′, as and for the purpose described.

4. A concave or dish-shaped flying target composed of a suitable fragile material, and slotted at its periphery to receive a flat tongue, said target having a strengthening-rim, C, at the margin of its flange B, as and for the purpose herein described.

5. A flat tongue projecting from the periphery of a flying target, for the purpose of enabling the latter to be thrown in the manner herein described, said flat tongue being separate and distinct from the target proper, as set forth.

In testimony whereof I affix my signature in presence of two witnesses.

GEORGE LIGOWSKY.

Witnesses:
JAMES H. LAYMAN,
F. R. MCCORMICK.